US011897109B2

(12) United States Patent
Yoshikane et al.

(10) Patent No.: US 11,897,109 B2
(45) Date of Patent: Feb. 13, 2024

(54) STRIKING TOOL

(71) Applicant: MAKITA CORPORATION, Anjo (JP)

(72) Inventors: Kiyonobu Yoshikane, Anjo (JP); Mizuki Yamamoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 210 days.

(21) Appl. No.: 17/575,776

(22) Filed: Jan. 14, 2022

(65) Prior Publication Data

US 2022/0250225 A1 Aug. 11, 2022

(30) Foreign Application Priority Data

Feb. 10, 2021 (JP) ................................ 2021-020225

(51) Int. Cl.
*B25D 17/04* (2006.01)

(52) U.S. Cl.
CPC ...... *B25D 17/043* (2013.01); *B25D 2211/068* (2013.01); *B25D 2250/345* (2013.01); *B25D 2250/371* (2013.01)

(58) Field of Classification Search
CPC ............ B25D 17/043; B25D 2250/245; B25D 2222/57; B25D 2250/371; B25D 2211/068; B25D 2250/345
USPC ....................................................... 173/162.2
See application file for complete search history.

(56) References Cited

U.S. PATENT DOCUMENTS 5,697,456 A * 12/1997 Radle .................. B25D 17/043 173/162.2
2014/0352994 A1 12/2014 Yoshikane et al.
2019/0061132 A1* 2/2019 Mori ..................... B23D 51/16

FOREIGN PATENT DOCUMENTS

JP 2014-231126 A 12/2014

* cited by examiner

*Primary Examiner* — Jacob A Smith
(74) *Attorney, Agent, or Firm* — Oliff PLC

(57) ABSTRACT

An objective is to provide a technique to securely protect the striking tool even when the striking tool inadvertently falls down. A striking tool including a rotating shaft relatively rotatably connect a main body with a handle, a first elastic member reducing transmitting of vibration from the main body to the handle in a case that the handle relatively rotates to the main body, wherein the handle includes a battery mounting portion to which battery to drive the motor is attachable and the handle is arranged to relatively move to the main body across the rotating shaft, and an adjuster such that the relative movement amount of the handle to the main body in a predetermined direction is adjusted to be larger than the relative movement amount in a direction other than the predetermined direction.

17 Claims, 6 Drawing Sheets

STRIKING TOOL

FIELD OF THE INVENTION

This disclosure relates to a striking tool having an improved protectability of the body against the external force.

BACKGROUND OF THE INVENTION

JP 2014-231126 discloses an example of the striking tool. The striking tool includes a main body with a motor, a motion converting mechanism and a striking mechanism. The known striking tool further includes a handle relatively rotatably connected to the main body via a rotating shaft and a cushion coil spring to reduce the vibration transmission from the main body to the handle when the handle relatively rotates to the main body. In other words, the striking tool is namely provided with a vibration reducing handle structure. Further, a battery for driving the motor is detachably attached to the lower region of the handle.

The striking tool as described above is characterized as a portable tool served for a striking operation being held by the user. On the other hand, the striking tool may possibly inadvertently be fallen down. In this case, because the battery generally and relatively has heavy weight in comparison with other parts, the end portion of the battery exposed to the outside (namely the exposed rear end portion of the battery) tends to head in the falling direction and thus, impact force from the ground etc. may possibly directly be exerted to the battery.

Such impact force may possibly damage the battery and/or the battery mounting portion provided at the main body for mounting the battery to the main body. Therefore, the exertion of the impact force to the battery should be avoided as much as possible.

On the other hand, it is not realistic to usually fix the portable striking tool in order to prevent the falling down. Therefore, it is desired to maximize the protectability of the battery and the striking tool even when the striking tool falls down.

SUMMARY OF THE INVENTION

It is an object of the invention to provide with a technique to securely protect the striking tool even when the striking tool inadvertently falls down.

In order to achieve the above-described object, one embodiment of this disclosure provides a striking tool comprising:

- a main body having a motor and a mechanism part driven by the motor to make an end tool operate striking movement,
- a handle to be held by a user of the striking tool,
- a rotating shaft relatively rotatably connect the main body with the handle,
- a first elastic member disposed between the main body and the handle, wherein the first elastic member reduces transmitting of vibration from the main body to the handle in a case that the handle relatively rotates around the rotating shaft.

The handle includes a battery mounting portion to which battery to drive the motor is attachable and the handle is arranged to relatively move to the main body across the rotating shaft, Further, the striking tool includes an adjuster to adjust the relative movement amount of the handle to the main body such that the relative movement amount of the handle to the main body in a predetermined direction is larger than the relative movement amount of the handle to the main body in a direction other than the predetermined.

According to the representative striking tool, the first elastic member reduces transmitting of vibration from the main body to the handle when the handle relatively rotates to the main body (hereinafter referred to as "vibration reduction"). Further, when inadvertent external force is exerted to the striking tool (typical case is that the user inadvertently falls the striking tool down), the handle is relatively movable to the main body across the rotating shaft, while the rotating shaft is put between the handle and the main body. Thus, damage to the striking tool by the external force is alleviated. Further, the striking tool includes an adjuster to adjust the relative movement amount of the handle to the main body such that the relative movement amount of the handle to the main body in a predetermined direction is larger than the relative movement amount of the handle to the main body in a direction other than the predetermined. Therefore, for example with respect to the direction in which the striking tool may possibly be highly damaged, the adjuster can adjust the relative movement amount of the handle to the main body to be larger than other direction. Thus, damage alleviation can be done.

The representative striking tool requires at least a striking operation to the end tool, while for example, rotating operation can be further performed by the striking tool. The motor and the mechanism part can be accommodated (housed) in a single main body or can be respectively accommodated in separately formed motor housing and gear housing.

The rotating shaft may be integrally formed with the handle. Otherwise, the rotating shaft may be separately formed and then, combined with the handle and/or the main body.

The relative movement of the handle to the main body across the rotating shaft may typically be defined by a linear motion, while it can be defined by curved or circular motion. As to "across the rotating shaft" with respect the relative movement of the handle, it can typically be made by forming a space around the rotating shaft such that the handle relatively moves to the main body by means of the space.

As to the "predetermined direction", it may typically be a direction in which external force is exerted when any inadvertent external force is exerted to the striking tool.

According to this disclosure, a technique is provided to securely protect the striking tool even when the striking tool inadvertently falls down.

EMBODIMENT TO EXPLOIT THE DISCLOSURE

As to the above-described structure, a second elastic member may be disposed around the rotating shaft between the main body and the handle. By this structure, damage to the striking tool due to the external force can effectively be alleviated.

Further, the adjuster may be disposed in a region remote from the rotating shaft.

Moreover, the adjuster may include an elongated opening and a projecting portion inserted to the elongated opening and then, the longitudinal direction of the elongated opening generally may coincide with the predetermined direction.

Further, the representative striking tool may include a battery mounted to the battery mounting portion. The predetermined direction may be an impact force exerting direction defined as a direction in which falling impact heads toward the main body via the battery in a case that the striking tool falls down.

Typically, the impact force exerting direction may be defined as a direction to head towards the gravity center of the main body from the battery. More typically, the impact force exerting direction may be defined by a line that connect the rear end portion of the battery with the gravity center of the striking tool to which the battery is mounted.

Further, the representative striking tool may be provided with a working operation accessory integrally mountable to the main body. The impact force exerting direction may be defined as a direction to head towards the gravity center of the main body integrally with the working operation accessory.

Typically, the impact force exerting direction may be defined by a line that connect the rear end portion of the battery with the gravity center of the striking tool to which the battery and the working operation accessory are mounted.

Moreover, the main body may include a third elastic member disposed between the main body and the battery. The third elastic member may usually be in non-contact state with the battery. In other words, a predetermined distance may usually be provided between the third elastic member and the battery. And in case that impact force is exerted to the battery, the third elastic member may be in a contact state with the battery to alleviate the impact force by the third elastic member.

Further, the rotating shaft may be disposed at the front side of the battery at the main body.

Moreover, the first elastic member may be defined by a coil spring.

Hereinafter, in reference to the drawings from FIG. 1 to FIG. 5, the striking tool 101 according to the representative embodiment is explained.

The striking tool 101 is an example of the "striking tool" according to the disclosure.

Figure 1:
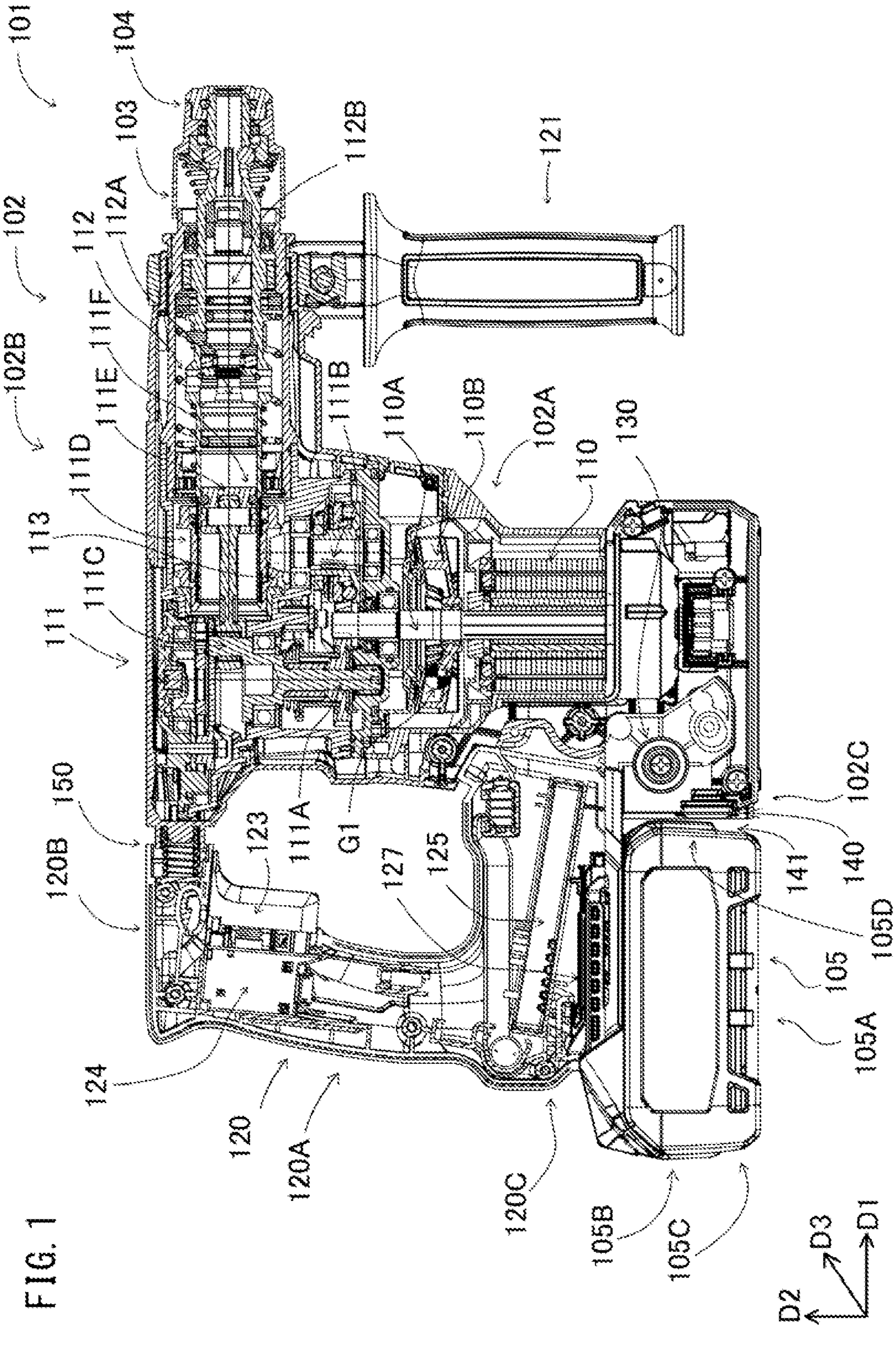
FIG. 1 is a front view (sectional view in part) showing the entire structure of the striking tool according to the representative embodiment.

The entire structure of the striking tool 101 is shown in FIG. 1 as a front view.

In this embodiment, for the sake of the explanation, the longitudinal direction of the striking tool 101 is defined as the first direction D1 (also called as "longitudinal direction that corresponds to the right-left direction in FIG. 1).

Further, the upper-lower direction crossing the longitudinal direction is defined as the second direction D2 (also called as "vertical direction" that corresponds to the upper-lower direction in FIG. 1).

Further, if it is not specifically noted, the direction as perpendicular both to the first direction and the second direction is defined as "width direction" or "right-left direction".

Moreover, while details will be described later, the direction in which outer force is exerted from the falling surface to the striking tool 101 when the striking tool falls down is defined as "outer force exerting direction D3".

<Entire Structure>

As shown in FIG. 1, the striking tool 101 generally includes a housing 102, a handle 120 and a sub-handle as is externally viewed.

The housing 102 is an example corresponding to the "main body".

The housing 102 includes a first housing region 102A defining the central region, a second housing region 102B defining the upper region and a battery front side region 102C defining the lower region.

<Inner Structure of the Housing 102>

A motor 110 is disposed at the first housing region 102A. The motor 110 includes an output shaft 110A and a cooing fan 110B. The motor 110 is disposed such that the output shaft 110A extends in the second direction D2. According to this embodiment, a brushless motor is used as for the motor 110. Because the brushless motor can output relatively strong torque despite its compact size, it is preferably used for the striking tool 101.

In the second housing region 102B, a motion converting mechanism 111 and a striking mechanism 112 are disposed.

The motion converting mechanism 111 includes a first intermediate shaft 111A, a second intermediate shaft 111B, a crank mechanism 111C, a cylinder 111D and a piston 111E.

The striking mechanism 112 includes a striker 112A and an impact bolt 112B.

The first intermediate shaft 111A is connected to the output shaft 110A of the motor 110 to be driven to rotate. The first intermediate shaft 111A rotates the crank mechanism 111C around the second direction D2. In a case that the crank mechanism 111C rotates around the second direction D2, the piston 111E connected to the crank mechanism 111C via a link linearly reciprocates within the cylinder 111D in the first direction D1.

A striker 112A is disposed in the cylinder 111D. The striker 112A is moved in the first direction D1 by utilizing pressure fluctuation of an air chamber 111F caused by a reciprocating movement of the piston 111E. In a case that the striker 112A moves, kinetic energy of the striker 112A is transmitted to the impact bolt 112B. Thus, an impact bolt 112B moves within the tool holder 103 in the first direction D1 to linearly move an end tool (the end tool is not shown in drawings for the sake of convenience). As a result, the end tool performs the striking operation. Note that a chuck portion 104 is provided at the front end region of the second housing region 102B.

The second intermediate shaft 111B is provided parallel to the first intermediate shaft 111A and is connected to the output shaft of the motor 110 to be driven to rotate. The second intermediate shaft 111B rotates the tool holder 103 around the first direction D1 by means of a bevel gear 113. As the tool holder rotates around the first direction D1, the end tool (not shown) is rotated around the first direction D1. Thus, the rotating operation is performed. With respect to the striking operation and the rotating operation, only one of those operations or both operations can be performed by user's selection.

<Structure of the Handle 120>

The handle 120 generally includes a grip portion 120A, an upper side housing connecting region 120B and a lower side housing connecting region 120C. The grip portion 120A extends substantially perpendicular to the first direction D1 (also slightly intersect with the second direction D2) and is used for user's gripping. The grip portion 120A includes a trigger 123 at the upper region of the grip portion 120A for starting the operation and an electrical switch 124 electrically connected to the trigger 123.

The upper side housing connecting region 120B is integrally connected to the grip portion 120A and extends substantially to the first direction D1 such that the upper side housing connecting region is attached to the housing 102 via a coil spring 150. By the intervention of the coil spring 150, the upper side housing connecting region 120B is relatively movable to the housing 102 in the first direction D1. The coil spring 150 is an example corresponding to "the first elastic member".

The lower side housing connecting region 120C is integrally connected to the grip portion 120A and extends substantially to the first direction D1 such that the lower side housing connecting region is attached to the housing 102 via a rotating shaft 130. By the intervention of the rotating shaft 130, the lower side housing connecting region 120C is relatively rotatable to the housing 102 around the rotating shaft 130. The rotating shaft 130 is an example corresponding to "the rotating shaft".

In the lower side housing connecting region 120C, a controller 125 is provided. The controller controls the driving of the motor 110. Further, at the lower face side of the lower side housing connecting region 120C, a battery mounting portion 127 is disposed.

<Structure of the Sub-Handle 121>

The sub-handle 121 is also called as an auxiliary handle and so on. The sub-handle 121 is freely detachably attached to the front end region of the second housing region 102B. The sub-handle 121 is, in a state as attached to the striking tool 101, held by user's left hand if user holds the handle 120 by user's right hand.

<Structure of the Battery 105>

The battery 105 is mounted to the battery mounting portion 127 by sliding the battery 105 in the first direction D1. The battery 105 supplies drive current to the motor 110 accommodated in the housing 102.

The battery 105 in a state as mounted to the battery mounting portion 127 includes:

(1) a battery lower face part 105A substantially flat to the bottom face of the housing 102, (2) a battery rear face part 105B defining the rear face of the striking tool 101 in a state that the battery 105 is mounted to the striking tool 101, (3) a battery rear end part 105C defined as a marginal region between the battery lower face part 105A and the battery rear face part 105B so as to define the lower rear end of the striking tool 101 in a state that the battery 105 is mounted to the striking tool 101.

(4) a battery front face part 105D opposingly facing the battery front side region 102C formed at the lower side of the second housing region 102B of the housing 102.

Further, in the battery front side region 102C of the housing 120, a second cushion rubber 140 is opposingly disposed such that a separation space 141 is given between the second cushion rubber 140 and the battery front face 105D. The second cushion rubber 140 is an example corresponding to "the third elastic member".

<Structure of the Rotating Shaft 130 and its Circumferential Region>

Figure 2:
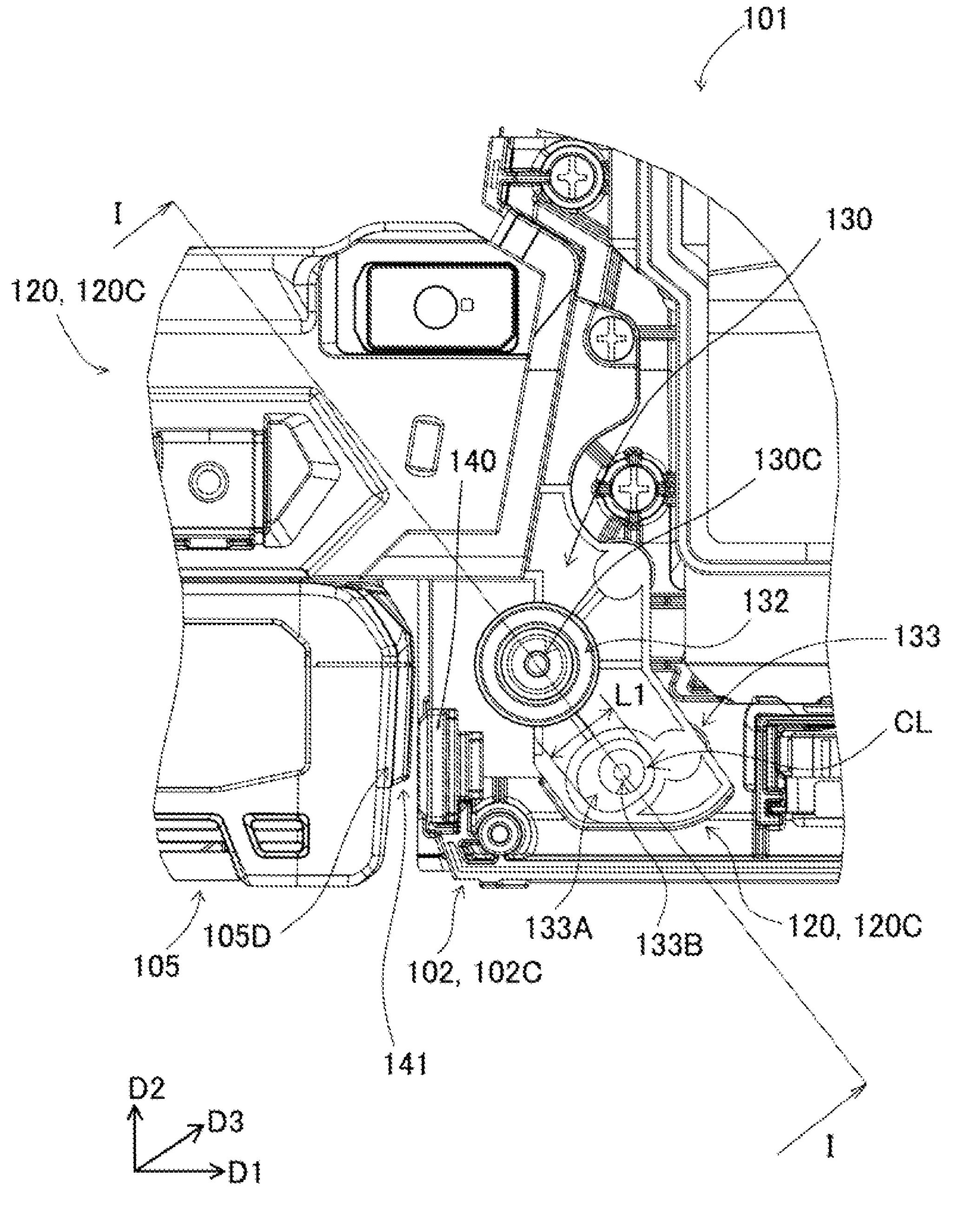
FIG. 2 is an enlarged view of the essential part of the striking tool according to FIG. 1.
Figure 3:
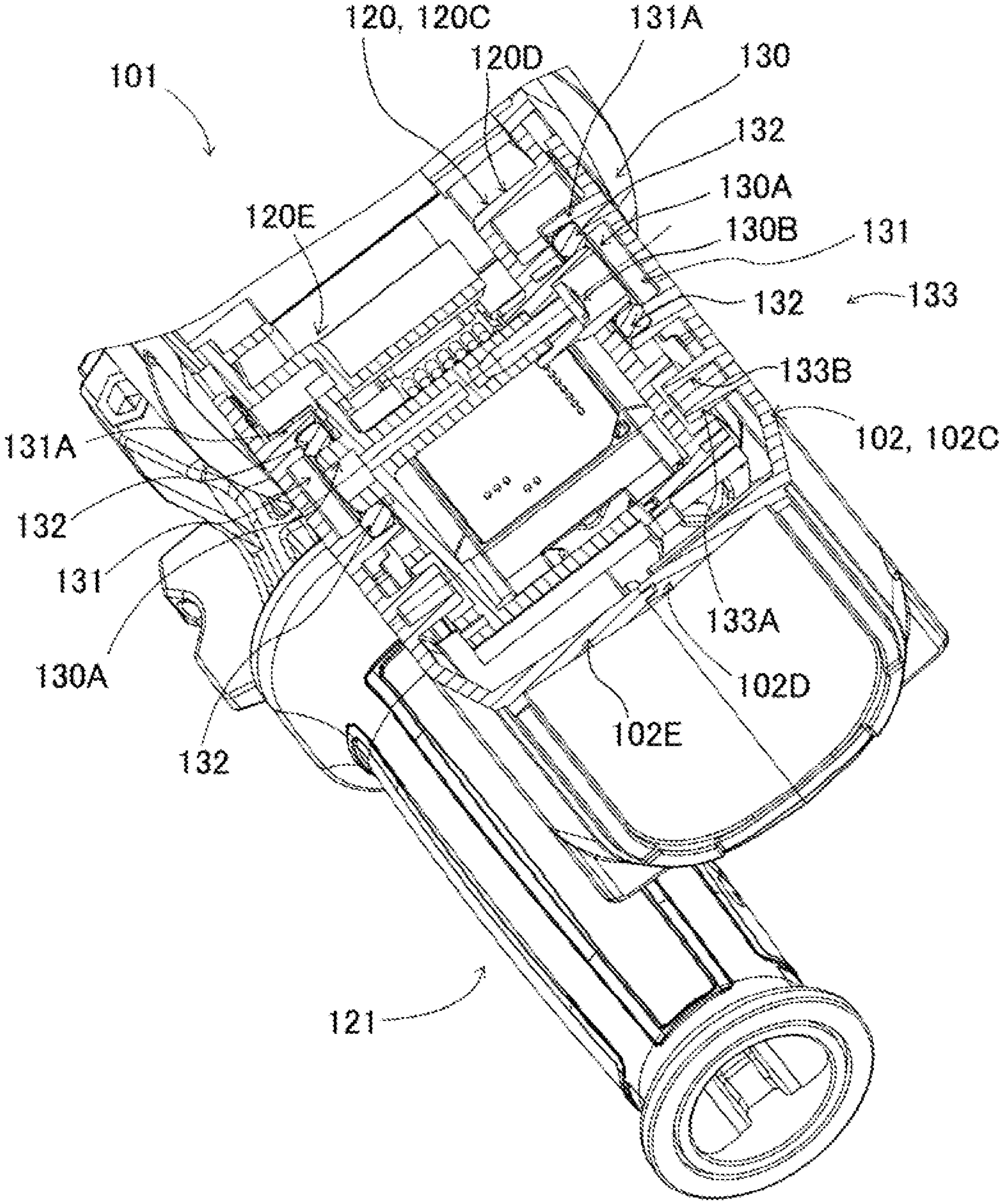
FIG. 3 is a sectional view in part at I-I line in FIG. 2.

Then, in reference to FIG. 2 and FIG. 3, the structure of the rotating shaft 130 and its circumferential region is explained in greater detail.

As shown in FIG. 2, the lower side housing connecting region 120C is relatively rotatably connected to the battery front side region 102C by means of the rotating shaft 140. Further, in a region remote from the rotating shaft 130 by a predetermined distance (lower region in the direction crossing both with the first direction D1 and the second direction D2 in this embodiment), a projecting portion 133B formed at the housing 102 side is loosely fitted to an elongated opening 133A formed at the handle 120 side.

The elongated opening 133A and the projecting portion 133B respectively define a handle relative movement adjuster 133. The elongated opening 133A includes a longitudinal axis extending in an external force exerting direction D3 which will be explained later. The projecting portion 133B is fitted to the elongated opening 133A at the inner wall of the elongated opening 133A with a certain amount of clearance CL (loose fit play). Thereby, the projecting portion 133B is relatively movable in the external force exerting direction D3 with relatively large scale, while in the direction other than the external force exerting direction D3 with relatively small scale. The handle relative movement adjuster 133 is an example of "the adjuster to adjust the relative movement amount of the handle to the main body".

FIG. 3 shows the I-I line sectional view of the FIG. 2. As shown in FIG. 3, the rotating shaft 130 includes a pair of rotating shaft convex portion 130A. The rotating shaft 130 is formed by combining a first divisional part 120D and a second divisional part respectively formed in a half split way and then, by securing by a fixing screw 130B. Namely, the rotating shaft 130 is formed integrally with the handle 120 by using component members of the handle 120

The rotating shaft 130 is rotatably held by a rotating shaft receiving portion 131 formed in a concaved shape in the housing 102. Specifically, the rotating shaft receiving portion 131 is provided in a pair in the right-left direction as a concaved spaces by combining the half split first division part 120D and the half split second division part 120E. The rotating shaft convex portion 130A is fitted to the rotating shaft receiving portion 131 with a clearance 131A. Further, as filling the clearance 131A, a first cushion rubber 132 is disposed to intervene between the rotating shaft 130 and the rotating shaft receiving portion 131. The first cushion rubber 132 is provided as an O-ring. The first cushion rubber 132 receives the rotating shaft 130 as intervening entirely in the radial direction in the rotating shaft receiving portion 131.

By the above-described structure, the housing 102 and the handle 120 are relatively rotatable around the rotating shaft 130.

Further, the housing 102 and the handle 120 are relatively movable across the rotating shaft 130 by the clearance 131A. In a case that the housing 102 and the handle 120 relatively moves across the rotating shaft 130, the first cushion rubber 132 is compressed in relation to the relative moving distance and alleviate the impact between the housing 102 and the handle 120. The first cushion rubber 132 is an example corresponding to the "second elastic member".

Further, as already explained in reference to FIG. 2, the handle relative movement adjuster 133 is arranged such that the projecting portion 133B formed at the housing 102 side is loosely fitted to the elongated opening 133A formed at the handle 120 side at the region remote from the rotating shaft 130 by the predetermined distance.

As shown in FIG. 3 in detail, the elongated opening 133A is formed as in a pair in the right-left direction and as entirely with the housing 120 by combining the half split first divisional part 120D and the half split second divisional part 120E for the handle 120.

Same, the projecting portion 133B is formed entirely with the housing 120 as in a pair in the right-left direction at the battery front side region 102C by combining the half split first divisional part 120D and the half split second divisional part 120E for the housing 102.

<Structure of the Battery Front Side Region 102C of the Housing 102>

Figure 4:
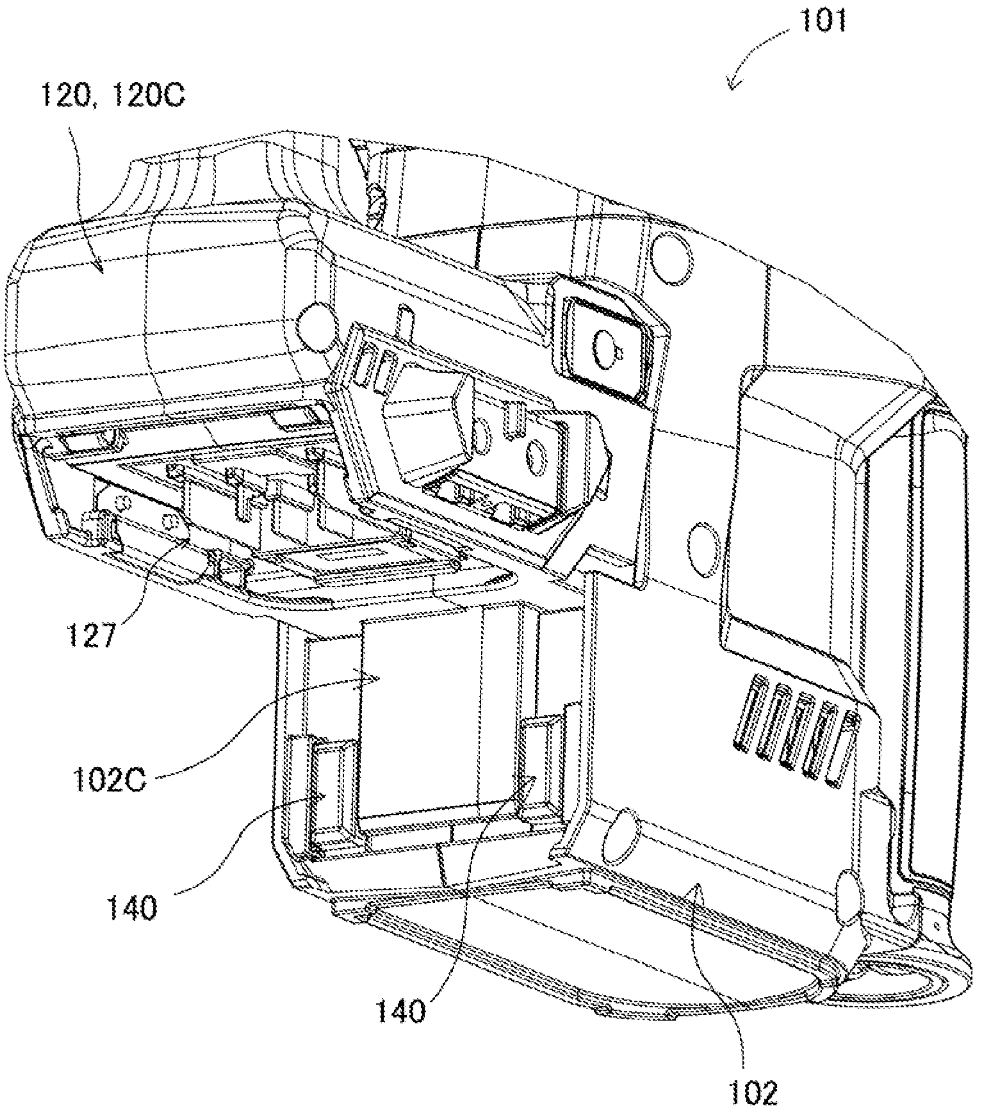
FIG. 4 is a perspective view showing the structure of the lower region of the handle and the battery front side region.

FIG. 4 shows the battery front side region 102C of the housing 102 and its circumferential region.

The second cushion rubber 140 is disposed at a pair in the right-left direction at the battery front side region 102C.

With respect to the handle 120, the battery mounting portion 127 is disposed at the lower side of the lower side housing connecting region 120C. The battery mounting portion 127 includes a slide guide for mounting the battery 105 and an electric power supply terminal.

<Operation of the Striking Tool 101>

Then, an operation of the striking tool 101 according to this embodiment is explained.

The user of the striking tool 101 hold the handle 120 as shown in FIG. 1 (or together with the sub-handle 121) and then, manually operates the trigger 123. The controller 125 receives the trigger ON signal from the electrical switch 125 electrically connected to the trigger 123 and the controller 125 controls the driving of the motor 110. In this embodiment, a brushless motor is used and therefore, the controller 125 drives the motor 110 by the PWM control (Pulse Width Modulation control).

The output rotation of the motor 110 is transmitted to the linear movement of the piston 111E within the cylinder 111D in the first direction D1 via the first intermediate shaft 111A and the crank mechanism 111C. By the linear movement of the piston 111E, the striker 112A is moved in the first direction D1 by means of the pressure fluctuation of the air chamber 111F in the cylinder 111D. In a case that the striker 112A is moved, the kinetic energy of the striker 112A is transmitted to the impact bolt 112B and the impact bolt 112B moves within the tool holder 103 in the first direction D1 such that the end tool (not shown) is activated to linearly move. Thus, the end tool performs the striking operation. Such the operation mode is defined as “hammer mode”.

Further, according to the striking tool 101, the user can select another operation mode in which the second intermediate shaft 111B as shown in FIG. 1 is mechanically connected to the output shaft 110A of the motor 110. Such the operation mode is defined as “drill mode”. In the drill mode, the second intermediate shaft 111B rotates the tool holder 103 around the first direction D1 by means of the bevel gear 113. By the rotation of the tool holder 103 around the first direction D1, the end tool (not shown) is rotated around the first direction D1 to perform the rotating operation.

In this embodiment, the user can arbitrary select one of any operation modes as “the hammer mode without the drill mode”, “the drill mode without the hammer mode” and “the combined operation mode of the hammer mode and the drill mode”.

<Operation of the Vibration Proof Handle>

When the operation is performed to the work by the striking tool 101, the housing 102 tends to receive relatively strong vibration because the housing accommodates the motion converting mechanism 111 and the striking mechanism 112. In order to prevent such vibration being transmitted from the housing to the handle 120, the vibration reducing mechanism functions. Namely, the housing 102 and the handle 120 are relatively rotatable around the rotating shaft 130 and the coil spring 150 is compressed by such relative rotation. Thus, the transmitting of the vibration from the housing 102 to the handle 120 is effectively prevented.

<Protection when the Striking Tool 101 Falls Down [1]>

Figure 5:
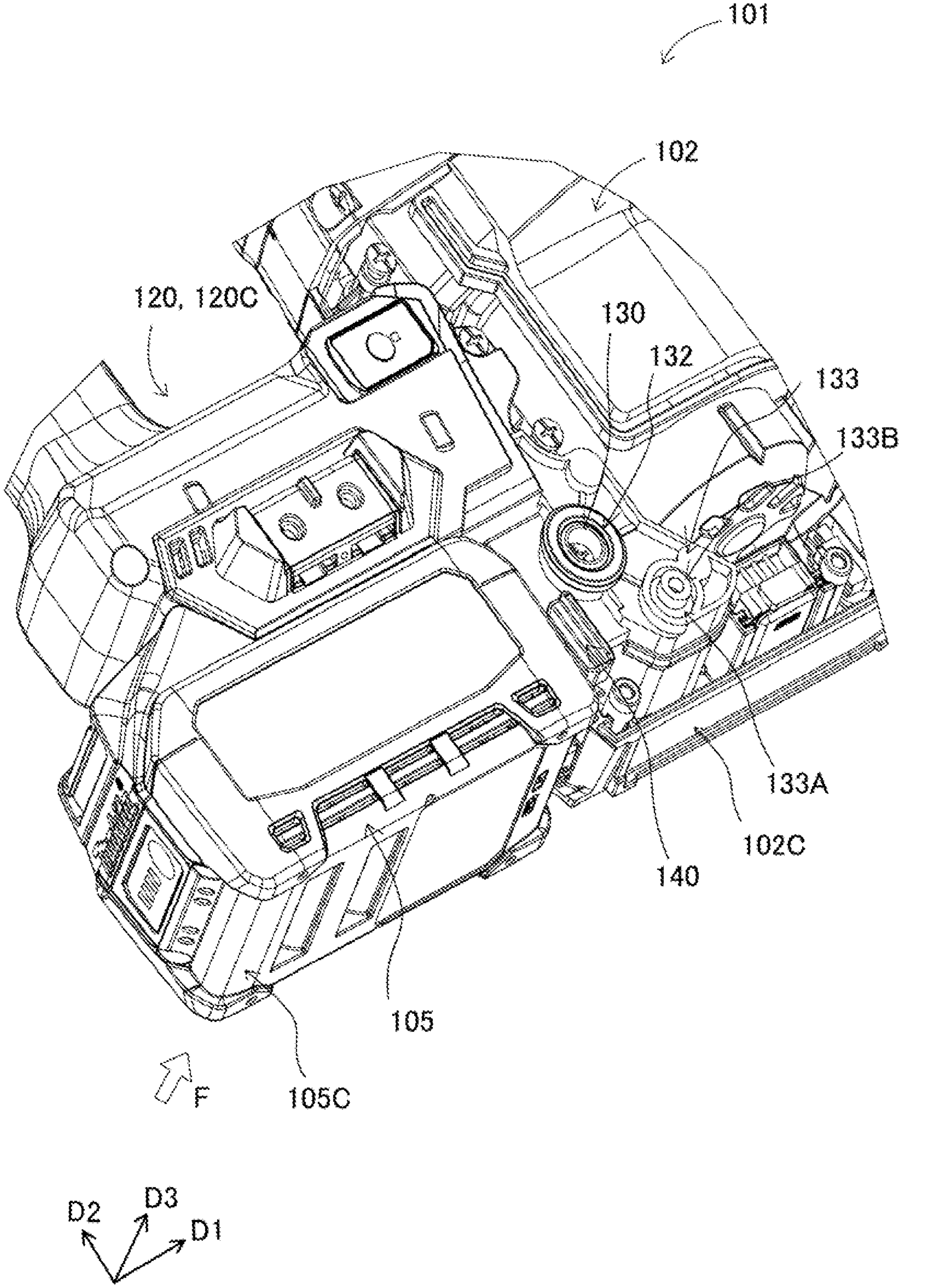
FIG. 5 is a perspective view in part showing the striking tool according to the representative embodiment to which external force is exerted when the striking tool falls down.

The striking tool 101 according to this embodiment is a portable type. Unlike the stational tool, the user usually holds the striking tool 100 to move around in the working place or the user may possibly put the striking tool on any higher place. In such a state, if the striking tool 101 as shown in FIG. 1 inadvertently falls down, the battery rear end part 105C tends to face (head) to the downward such that the hypothetic line connecting the gravity center of the striking tool 101 to which the battery 105 is mounted with the battery rear end part 105C substantially coincides with the vertical direction. Such a state is shown in FIG. 5. This is because the battery 105 mounted to the striking tool 101 is relatively heavy equipment.

In such a case, the impact force exerted when the striking tool 101 becomes in contact with the ground may possibly be applied to the battery rear end part 105C. In other words, the hypothetic line connecting the battery rear end part 105C and the gravity center G1 defines the vertical direction when the striking tool 101 falls down and also defines the direction in which the impact force of the falling down is exerted to the striking tool 101. In this Specification, this direction is defined as “the external force exerting direction D3”.

Such the impact force may possibly damage the battery 105 and the battery mounting portion 127 and therefore, should be avoided as much as possible.

In this embodiment, as shown in FIG. 2 and FIG. 3, the housing 102 and the handle 120 are (1) relatively rotatable around the rotating shaft 130 and also (2) relatively movable across the rotating shaft 130 by the clearance 131A. Further, when the housing 102 and the handle 120 relatively move across the rotating shaft 130, the first cushion rubber 132 is compressed in relation to the relative movement distance. Thus, the impact between the housing 102 and the handle 120 is alleviated.

Specifically, as shown in FIG. 5, when the striking tool 101 to which the battery 105 is mounted falls down such that the external force exerting direction D3 coincides with the vertical direction, the impact force F from the ground is exerted in the external force exerting direction D3.

In such a case, as shown in FIG. 2, the elongated opening 133A is provided to coincide with the external force exerting direction D2 at the handle relative movement adjuster 133. Therefore, the projecting portion 133B loosely fitted to the elongated opening 133A is movable within the elongated opening 133A by relatively longer distance (longitudinal distance L1 as shown in FIG. 2). Thus, when the impact force F is exerted in the external force exerting direction D3, the projecting portion 133B moves in the longitudinal direction of the elongated opening 133A by relatively longer distance to compress the first cushion rubber 132. As a result, the first cushion rubber 132 relatively largely compressed in the external force exerting direction D3 to effectively alleviate the impact force F.

Further, in this embodiment, the cushioning operation by the first cushion rubber 132 is arranged to be completed before the projecting portion 133B moves to the end of the longitudinal distance L1. Therefore, the handle relative movement adjuster 133 as itself can also effectively be protected against the impact force F.

<Protection when the Striking Tool 101 Falls Down [2]>

Further, as shown in FIG. 1, FIG. 2 and FIG. 4, the second cushion rubber 140 is disposed at the battery front side region 102C in the housing 102. Therefore, the impact force F exerted to the battery 105 is also alleviated by the second cushion rubber 140. Thus, further protection of the battery 105 and the battery mounting portion 127 against the impact at the time of falling down can be secured Moreover, as shown in FIG. 2, in a state that the battery 105 is mounted to the striking tool 101, the separation space 141 is usually given between the battery front face part 105D and the second cushion rubber 140. Therefore, the second cushion rubber 140 is free from the compression force when not cushioning the impact force and thus, deterioration over time of the second cushion rubber 140 can be alleviated.

<Protection in a Direction Other than the External Force Exerting Direction D3>

As already explained and as shown in FIG. 1 and FIG. 2, the handle relative movement adjuster 133 is arranged that the projecting portion 133B is loosely fitted to the elongated opening 133A by the clearance CL against the inner wall of the elongated opening 133A. In other words, the projecting portion 133B is also movable in the direction other than the external force exerting direction D3, while such movement is allowed by relatively smaller distance. Thus, in a case that the external force is exerted in a direction other than the external force exerting direction D3, the projecting portion 133B can compress the first cushion rubber 132 in relation to the clearance CL to alleviate the impact force.

<Protection when the Battery is not Mounted or Other Impact Force is Exerted>

Above explained aspects are referring to the case that the striking tool 101 with the battery 105 inadvertently falls down. On the other hand, structures of the rotating shaft 130 and the handle relative movement adjuster 130 relate to the cushioning mechanism between the housing 102 and the handle 120. In other words, these structures do not require the actual mounting of battery 105 and/or do not require the actual exertion of the impact force caused by the falling down of the striking tool 101. In this respect, these structures can effectively alleviate impact force exerted when the battery 105 is not mounted to the striking tool 102 or impact force other than the falling down.

<In a Case that Dust Collecting Attachment 160 is Attached to the Striking Tool 101>

Various types of working operation accessories can be mounted to the striking tool 101 according to this embodiment.

Figure 6:
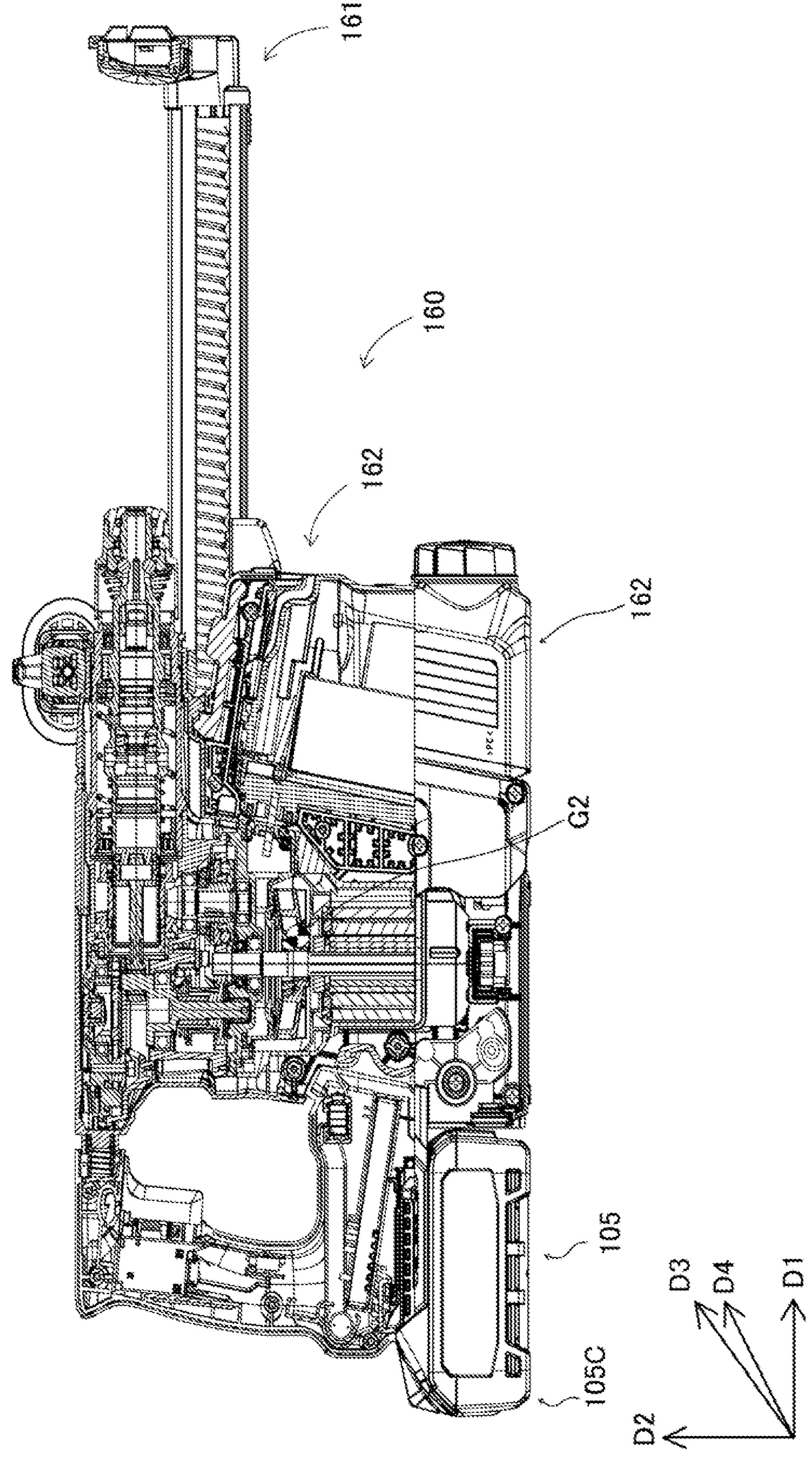
FIG. 6 is a front schematic view (sectional view in part) showing the status that the dust collecting attachment is mounted to the striking tool according to the representative embodiment.

Typically, as shown in FIG. 6, a dust collecting attachment 160 can be mounted to the front side of the striking tool 101 for sucking and collecting dust generated during the working operation.

The dust collecting attachment 160 includes a dust suction portion 161, a dust transferring portion 162 and a dust collecting portion 163. The dust collecting attachment 160 is an example corresponding to "the working operation accessory".

In FIG. 6, the gravity center of the striking tool 101 to which the dust collecting attachment 160 (and also the battery 105) is mounted is indicated as "G2". The gravity center G2 is shifted to the front side in comparison with the gravity center G1 as shown in FIG. 1. This is because the dust collecting attachment 160 with relatively heavy weight is attached to the front side of the striking tool 101.

In this case, when the striking tool 101 with the dust collecting attachment 160 inadvertently falls down, the direction to connect the battery rear end part 105*c* with the gravity center G2 coincides with the vertical direction. This direction is defined as "the external force exerting direction D4".

As shown in FIG. 6, the external force exerting direction D4 is shifted to the front side in the first direction D1 in comparison the external force exerting direction D3 for the striking tool without the dust collecting attachment 160 (see FIG. 1).

According to this embodiment, as already explained in reference to FIG. 1 and FIG. 2, the longitudinal axis of the elongated opening 133A coincides with the external force exerting direction D3 with respect to the handle relative movement adjuster 133. Further, the projecting portion 133 is loosely fitted to the inner wall of the elongated opening 133A by the certain amount of clearance.

Accordingly, in such a case that the dust collecting attachment 160 is mounted and then, the gravity center of the striking tool 101 is shifted such that the external force exerting direction during the falling down is slightly changed, the rotating shaft 130 can still compress the first cushion rubber 132 and impact force can effectively be alleviated.

Further, the second cushion rubber 140 as shown in FIG. 1, FIG. 2 and FIG. 4 can sufficiently alleviated the impact force to the battery 105 even when the external force exerting direction is slightly changed. Therefore, the aspect of the disclosure can effectively be applied to the case that working operation accessory with heavy weight is mounted and the gravity center of the entire striking tool 101 with such working operation accessory is shifted.

According to this embodiment, technique to securely protect the striking tool even when the striking tool 101 inadvertently falls down is provided. Accordingly, not only a protection of the battery 105 of the striking tool 101 but also a protection of the battery mounting portion 127 and a protection of the rotating shaft 130 can be secured.

EXPLANATION OF THE REFERENCE NUMBER

- 101: Striking tool
- 102: Housing (Main body)
  - 102A: First housing region
  - 102B: Second housing region
  - 102C: Battery front side region
  - 102D: First divisional body
  - 102E: Second divisional body
- 103: Tool holder
- 104: Chuck portion
- 105: Battery
  - 105A: Battery lower face part
  - 105B: Battery rear face part
  - 105C: Battery rear end part
  - 105D: Battery front face part
- 110: Motor
  - 110A: Output shaft
  - 110B: Cooling fan
- 111: Motion converting mechanism
  - 111A: First intermediate shaft
  - 111B: Second intermediate shaft
  - 111C: Crank Mechanism
  - 111D: Cylinder
  - 111E: Piston
  - 111F: Air chamber
- 112: Striking mechanism
  - 112A: Striker
  - 112B: Impact bolt

113: Bevel gear
120: handle
120A: Grip portion
120B: Upper side housing connecting region
120C: Lower side housing connecting region
120D: First divisional part
120E: Second divisional part
121: Sub-handle
123: Trigger
124: Electrical switch
125: Controller
127: Battery mounting portion
130: Rotating shaft
130A: Rotating shaft convex portion
130B: Fixing screw
131: Rotating shaft receiving portion (Concave portion: housing side)
131A: Clearance
132: First cushion rubber (second elastic member)
133: Handle relative movement adjuster
133A: Elongated opening (handle side)
133B: Projecting portion (housing side)
140: Second cushion rubber (Third elastic member)
141: Separation space
150: Coil spring (first elastic member)
160: Dust collecting attachment
161: Dust suction portion
162: Dust transferring portion
163: Dust collecting portion (Working operation accessory)
CL: Clearance
D1: First direction (longitudinal direction)
D2: Second direction (Upper-lower direction)
D3: External force exerting direction (in the event of dropping)
D4: External force exerting direction (in the event of dropping with an working accessory
G1: Gravity center (of the striking tool)
G2: Gravity center (of the striking tool with working accessory)
L1: Longitudinal axis distance

The invention claimed is:

1. A striking tool comprising:

a main body having a motor and a mechanism part driven by the motor to make an end tool operate striking movement, a handle to be held by a user of the striking tool, a rotating shaft relatively rotatably connect the main body with the handle, a first elastic member disposed between the main body and the handle, wherein the first elastic member reduces transmitting of vibration from the main body to the handle in a case that the handle relatively rotates around the rotating shaft, wherein the handle includes a battery mounting portion to which battery to drive the motor is attachable and the handle is arranged to relatively move to the main body across the rotating shaft, and an adjuster to adjust the relative movement amount of the handle to the main body such that the relative movement amount of the handle to the main body in a predetermined direction is larger than the relative movement amount of the handle to the main body in a direction other than the predetermined direction.

2. The striking tool according to claim 1, wherein a second elastic member is disposed around the rotating shaft between the main body and the handle.

3. The striking tool according to claim 1, wherein the adjuster is disposed in a region remote from the rotating shaft.

4. The striking tool according to claim 1, wherein the adjuster includes an elongated opening and a projecting portion inserted to the elongated opening, wherein the longitudinal direction of the elongated opening generally coincides with the predetermined direction.

5. The striking tool according to claim 1, further comprising a battery mounted to the battery mounting portion, wherein the predetermined direction is an impact force exerting direction defined as a direction in which falling impact heads toward the main body via the battery in a case that the striking tool falls down.

6. The striking tool according to claim 5 wherein the impact force exerting direction is defined as a direction to head towards the gravity center of the main body from the battery.

7. The striking tool according to claim 5, further comprising a working operation accessory integrally mounted to the main body, wherein the impact force exerting direction is defined as a direction to head towards the gravity center of the main body integrally with the working operation accessory.

8. The striking tool according to claim 5, wherein the main body includes a third elastic member disposed between the main body and the battery.

9. The striking tool according to claim 8, wherein the third elastic member is normally non-contact with the battery.

10. The striking tool according to claim 5, wherein the rotating shaft is disposed at the front side of the battery at the main body.

11. The striking tool according to claim 1, wherein the first elastic member is defined by a coil spring.

12. The striking tool according to claim 1, wherein a second elastic member is disposed around the rotating shaft between the main body and the handle and the adjuster is disposed in a region remote from the rotating shaft.

13. The striking tool according to claim 1, wherein the adjuster is disposed in a region remote from the rotating shaft and the adjuster includes an elongated opening and a projecting portion inserted to the elongated opening, wherein the longitudinal direction of the elongated opening generally coincides with the predetermined direction.

14. The striking tool according to claim 1, wherein a second elastic member is disposed around the rotating shaft between the main body and the handle, wherein the adjuster is disposed in a region remote from the rotating shaft and the adjuster includes an elongated opening and a projecting portion inserted to the elongated opening, wherein the longitudinal direction of the elongated opening generally coincides with the predetermined direction.

15. The striking tool according to claim 1, wherein the adjuster includes an elongated opening and a projecting portion inserted to the elongated opening, wherein the longitudinal direction of the elongated opening generally coincides with the predetermined direction, the striking tool further comprising a battery mounted to the battery mounting portion, wherein the predetermined direction is an impact force exerting direction defined as a direction in which falling impact heads toward the main body via the battery in a case that the striking tool falls down.

16. The striking tool according to claim 1, wherein the adjuster includes an elongated opening and a projecting portion inserted to the elongated opening, wherein the longitudinal direction of the elongated opening generally coincides with the predetermined direction, the striking tool further comprising a battery mounted to the battery mounting portion, wherein the predetermined direction is an impact force exerting direction defined as a direction in which falling impact heads toward the main body via the battery in a case that the striking tool falls down and the impact force exerting direction is defined as a direction to head towards the gravity center of the main body from the battery.

17. The striking tool according to claim 1, wherein the adjuster includes an elongated opening and a projecting portion inserted to the elongated opening, wherein the longitudinal direction of the elongated opening generally coincides with the predetermined direction, the striking tool further comprising a battery mounted to the battery mounting portion, wherein the predetermined direction is an impact force exerting direction defined as a direction in which falling impact heads toward the main body via the battery in a case that the striking tool falls down, the impact force exerting direction is defined as a direction to head towards the gravity center of the main body from the battery and the main body includes a third elastic member disposed between the main body and the battery.

* * * * *